(12) United States Patent
Stockmar et al.

(10) Patent No.: US 11,884,064 B2
(45) Date of Patent: Jan. 30, 2024

(54) SYSTEM AND METHOD FOR CONTROLLING A PRINTING DEVICE

(71) Applicant: Canon Production Printing Holding B.V., Venlo (NL)

(72) Inventors: Martin Stockmar, Poing (DE); Stefan Brecht, Munich (DE); Hubert Drexler, Taufkirchen (DE)

(73) Assignee: Canon Production Printing Holding B.V., Venlo (NL)

( * ) Notice: Subject to any disclaimer, the term of this patent is extended or adjusted under 35 U.S.C. 154(b) by 1 day.

(21) Appl. No.: 17/484,517

(22) Filed: Sep. 24, 2021

(65) Prior Publication Data

US 2022/0097359 A1    Mar. 31, 2022

(30) Foreign Application Priority Data

Sep. 25, 2020 (DE) .......................... 102020125039.8

(51) Int. Cl.
*B41J 2/045* (2006.01)
*B41J 3/60* (2006.01)

(52) U.S. Cl.
CPC ....... *B41J 2/04508* (2013.01); *B41J 2/04586* (2013.01); *B41J 3/60* (2013.01)

(58) Field of Classification Search
CPC ...... B41J 2/04508; B41J 2/04586; B41J 3/60; B41J 2/2135; H04N 1/3935; H04N 1/393
See application file for complete search history.

(56) References Cited

U.S. PATENT DOCUMENTS

| | | |
|---|---|---|
| 2003/0175602 A1 | 9/2003 | Kazama |
| 2010/0225932 A1 | 9/2010 | Kurose et al. |
| 2010/0296117 A1 | 11/2010 | Dobbertin et al. |
| 2014/0063108 A1* | 3/2014 | Iijima .................. B41J 13/0009 347/16 |
| 2014/0063513 A1 | 3/2014 | Enge et al. |

FOREIGN PATENT DOCUMENTS

| | | |
|---|---|---|
| JP | 2003266774 A | 9/2003 |
| JP | 6686755 B2 * | 4/2020 |

OTHER PUBLICATIONS

Drexler, H, A Method And Device For Controlling Electrographic Printer Or Copier, Dec. 2005, China, All pages (Year: 2005).*

(Continued)

*Primary Examiner* — Justin Seo
*Assistant Examiner* — Tracey M McMillion
(74) *Attorney, Agent, or Firm* — The Webb Law Firm (57) ABSTRACT

A printing device may include two printers for printing to the front side and the back side of a recording medium. The physical page length of at least one print image applied onto the front side of the recording medium is determined. The required page length of at least one print image to be applied onto the back side of the recording medium is adapted to the determined page length. At least one print line of the print image for the back side is printed repeatedly if the required page length for application of the rear print page onto the back side of the recording medium is smaller than the determined page length.

16 Claims, 6 Drawing Sheets

(56) References Cited

OTHER PUBLICATIONS

Baumgartner, R, Method For Printing On Recording Medium E.g. Paper With Inkjet Printing Apparatus, Involves Adapting A Print Image By Omitting Or Adding Print Lines, When Detected Recording Medium Length Change Exceeds Preset Length Change Value, Jan. 2016, DE, All pages (Year: 2016).*
Otsuka Kazuo, Double-sided Printing Apparatus, Mar. 27, 2002, Europe, All Pages (Year: 2002).*
Uchida Yuji, Image Formation Apparatus, Jan. 18, 2018, Japan, All Pages (Year: 2018).*
German Search Report dated Jun. 14, 2021, Application No. 10 2020 125 039.8.

* cited by examiner

SYSTEM AND METHOD FOR CONTROLLING A PRINTING DEVICE

CROSS REFERENCE TO RELATED APPLICATIONS

This patent application claims priority to German Patent Application No. 102020125039.8, filed Sep. 25, 2020, which is incorporated herein by reference in its entirety.

BACKGROUND

Field

The disclosure relates to a method for controlling a printing device, in particular an inkjet printing device, as well as such a printing device. The page length of a first front side printed to with a print image is determined, and the page length of a second back side to be printed to with a print image is adapted to the determined page length of the front side.

Related Art

The disclosure is in particular used in digital printing, which is also referred to as "Direct Digital Printing" (DDP) or Computer-to-Print in international parlance. Digital printing refers to a group of printing methods in which the print image is transferred directly by a computer from a file or a print data stream to a printing device without a static printing form being used. In generating print images with the aid of a digital printing device, print dots are generated per line and per column depending on the print data. The print dots generated in the line and column raster are also referred to as raster points or pixels. To generate a raster dot in a desired color, color dots of individual color separations in this raster are printed and, at least to the observer, a mixed color is optically generated.

In particular given what is known as continuous printing to recording media in the form of a web, with at least two printing units in succession and a first fixing/drying after the printing to the front side by the first printing unit, the required page length of the front side that is printed to on the recording medium changes upon fixing or drying. The recording medium typically shrinks after this process. In order to counteract this phenomenon, upon printing the front side, this is correspondingly printed to while stretched. Ideally, the required page length of the back side then precisely matches the page length of the front side after the fixing and/or drying, so that ideally the front side and back side overlap exactly in length and width. In the printing process, this precise overlapping of the front side and back side is referred to as being in register. In order to take the change of the page length into account in the subsequent printing to the back side, methods are known in order to compensate for the page length between the first printing unit and the second printing unit. Otherwise, front side and back side would not be printed to congruently, meaning in register. Given large discrepancies, the print good produced from the recording medium that was printed to would be unusable. The method for length compensation should not visibly negatively affect the quality of the print good.

In the prior art, various methods are known that match the length of print regions on a front side to be printed to of a recording medium and a back side to be printed to of a recording medium to one another.

One method already takes the change of the length of the print page into account in the preparation of the print data in the raster image processor (RIP), which generates raster images from the print data, which are preferably provided in a page description language. Given this first method, it is especially difficult and costly that no unwanted, i.e. no visible, image distortions (what are known as artifacts) are created by the method steps for enlarging/reducing the print images. Furthermore, this method may only take into account static size changes of the print pages, since an actual or dynamic length change of the recording medium is not known at the point in time of the image preparation with the aid of the raster image processor. This first method is therefore presently not used by the applicant for the adaptation of the page length of a print page, but rather only given a necessary compensation of the paper shrinkage in the width and/or length of the print image.

A second method is to generate the line timing for generation of the print lines with the aid of a rotary encoder that normally exactly reproduces the line timing for firing the print heads in inkjet printing devices to the feed of the recording medium. A flexible length change to a dynamic length change of the print page is not possible with this second method.

Given a further third method, print lines can be added or removed from the print image on the back side by the print head control electronics (in combination or alternatively). The actual length of a printed front side may hereby be measured by the print head control electronics before the back side is printed. For this purpose, the printer may have a marking sensor, for example. Every printed front side may have a pre-printed marking on the recording medium. Based on the measured page length, even before the printing of the back side, the logical page length of the back side may be taken into account for the actual measured page length of the front side by the print head control electronics. The page length of the logical print page for the back side of the recording medium is equal in size to the page length of the logical print page for the front side. Given a resolution of 1200 dpi, 14031 print lines fit on a DIN A4 page with a length of 297 mm in portrait format. To compensate for the shrinkage after fixing, the front side is stretched in the first printing unit so that the 14031 print lines now require 300 mm. As has already been mentioned, the physical expansion may alter the logical front side.

After the stretching upon printing and after the drying/fixing, should the physical length of the printed front side on the recording medium be smaller than is required for the physical length of the logical back side, meaning that not all print lines of the logical back side fit on the page length determined for the front side, print lines are dropped at the end of the print page for the back side. Just before the printing of the back side, this may thus be shortened accordingly. For example, the page length of a previously DIN A4 is only 296 mm in portrait format after the fixing and/or drying (given a shrinkage of 0.1% from 297 mm), such that only 13891 lines of the back side still fit thereon. In this instance, 46 lines would accordingly be dropped. In reality, the difference is much smaller, so that only around six lines are dropped.

In the reverse instance, should the measured page length of the front side be greater than the length on the recording medium that is required for the logical page length of the back side, then blank print lines are added at the end of the print page, meaning that only a feed of the recording medium by the determined number of lines takes place. It is hereby ensured that the print page to be subsequently printed on a recording medium in the form of a web begins at the correct location. This has proven to be advantageous in particular given what is known as transaction printing, thus upon printing of invoices, forms etc. Typically, for this purpose a white border region, meaning an unprinted border region, is generated or left at the end of a page.

In particular when the successive print pages should be continuously used as a unit, for example as given banner printing, disruptive white regions between the print pages that are unacceptable for the desired printing result are created due to the insertion of white lines.

In practice, the cited three methods may also be used in combination. For example, given length compensation with the aid of the first and second tested method, a static portion may be compensated without information loss in the print image occurring. A dynamic portion may then additionally be compensated with the third tested method. As a result, it is thereby achieved that front side and back side remain congruent over the entire continuous printing operation, and as little print information as possible is lost.

A method for enlarging print images with a plurality of coupled printing devices is known from the document US 2010/0296117 A1, wherein printer components of the printing devices that match one another are selected in order to minimize the print image differences of the print images generated by the different printing devices.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

An object of the present disclosure is to provide a simple method in which the length of print images of the back side that are to be printed is dynamically adaptable to the actual page length of a print page of the front side, without thereby exhibiting the disadvantages present in the third method explained above.

Via a method according to the disclosure, it is advantageously achieved that the page length of the print image of the front side is determined and, if the page length of the print image of the back side is smaller than the determined page length of the printed print page of the front side, at least the last line of the print image of the back side is repeatedly printed. In particular, gaps between two successively printed print images may hereby be avoided, so that visually a single continuous print image is generated.

A second aspect relates to a corresponding printing device, with at least one first printing unit for printing at least one front print image on the front side of the recording medium; and with at least one second printing unit for printing at least one rear print image on the back side of the recording medium. The printing device comprises at least one sensor for detecting a marking located on the recording medium and/or for detecting an edge of an individual sheet. The printing device also comprises at least one controller that is connected with the sensor in order to determine the page length of a print image applied at least on the front side of the recording medium, in order to adapt the required page length of at least one print image to be applied onto the back side of the recording medium to the determined page length of the front side. If the required page length is smaller than the determined page length, at least one print line of the print image for the back side is then repeatedly printed.

Figure 1A:
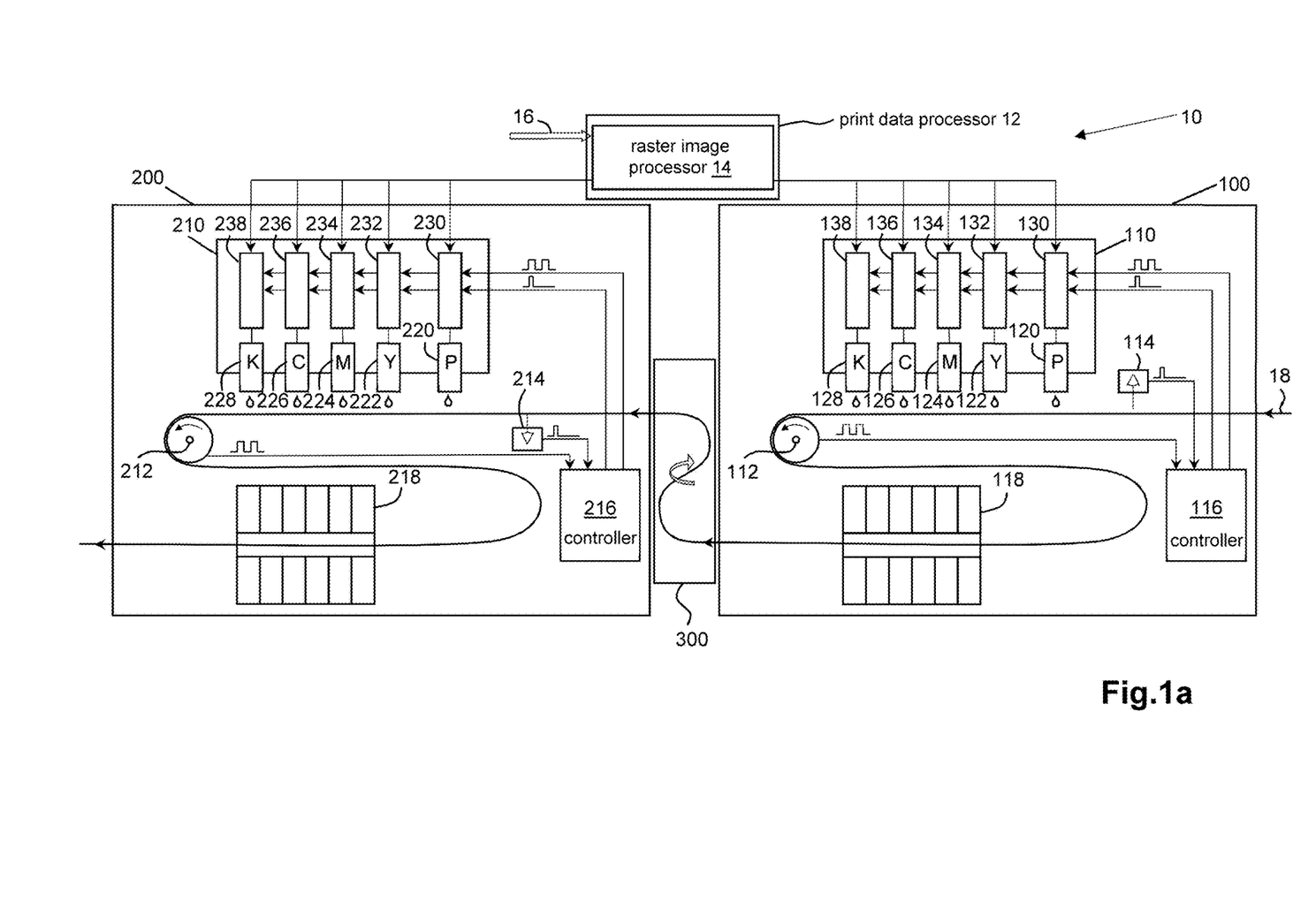
FIG. 1a a block diagram of a printing device for generating print images on a recording medium in the form of a web, according to an exemplary embodiment.

FIG. 1a shows a block diagram of a printing device 10 with two printing units (printers) 100, 200 for generating print images on a recording medium 18 in the form of a web. The recording medium 18 in the form of a web is in particular a paper web that can be printed to with print images on the front side 18a with the aid of the first printing unit 100, and with print images on the back side 18b of the recording medium 18 with the aid of the printing unit 200. A turning and length compensation unit 300 is arranged between the first printing unit 100 and the second printing unit 200. To process print data, the printing device 10 comprises a print data processor 12 that comprises a raster image processor 14. The print data are preferably supplied as a print data stream 16 to the print data processor 12. The print data stream 16 is in particular a PDL print data stream that contains information about the print images to be printed in a page description language.

The first printing unit (printer) 100 may comprise a first print group 110 having four print bars 122 to 128 for printing print images in four different primary colors (black, cyan, magenta, yellow) and a print bar 120 for applying a primer. The print bars 120 to 128 respectively comprise a plurality of print heads that respectively have a plurality of print nozzles arranged in rows and columns that, with the aid of print bar controllers 130 to 138 respectively associated with a print bar 120 to 128, are activated depending on the print data supplied by the raster image processor 16 and a printing signal generated by the apparatus controller 116. The print heads and the print bars 120 to 128 are arranged stationary over the entire width of the recording medium 18. In an exemplary embodiment, one or more of the print bar controllers 130-138 and/or controller 116 include processing circuitry that is configured to perform one or more respective functions of the controller 130-138 and/or controller 116.

On the front side 18a of the (here continuous) recording medium 18, a pre-printed print marking that is detected with the aid of a first sensor 114 is printed for the detection of the beginning of a print page, preferably in a region that is not visible in a later print product. Depending on the detection of the marking, the apparatus controller 116 controls the print head controllers 130 to 138 such that the color separations generated by the print bars 122 to 128, and the primer applied with the aid of the print bar 120, are printed at the correct position on the front side of the recording medium.

The printing unit 100 also comprises a rotary signal encoder 112 that detects the movement of the continuous recording medium 18 through the printing unit 100 and transmits a corresponding signal to the apparatus controller 116. After the application of the primer and of the color separations, the continuous recording medium 18 is guided through a drying unit 118 in which the color separations are dried and thereby fixed on the front side of said continuous recording medium.

The design and function of the second printing unit (printer) 200 for printing to the back side 18b of the recording medium 18 is identical to as is described for the first printing unit 100. Only the second sensor 214 is arranged such that it detects the pre-printed markings on the front side 18a of the continuous recording medium 18, by contrast to which the color separations and the primer are printed on the back side of the continuous recording medium 18. In reference characters, identical elements, or elements having an identical function, of the second printing unit 200 are differentiated from the elements of the first printing unit 100 by the addition of 100.

Figure 1B:
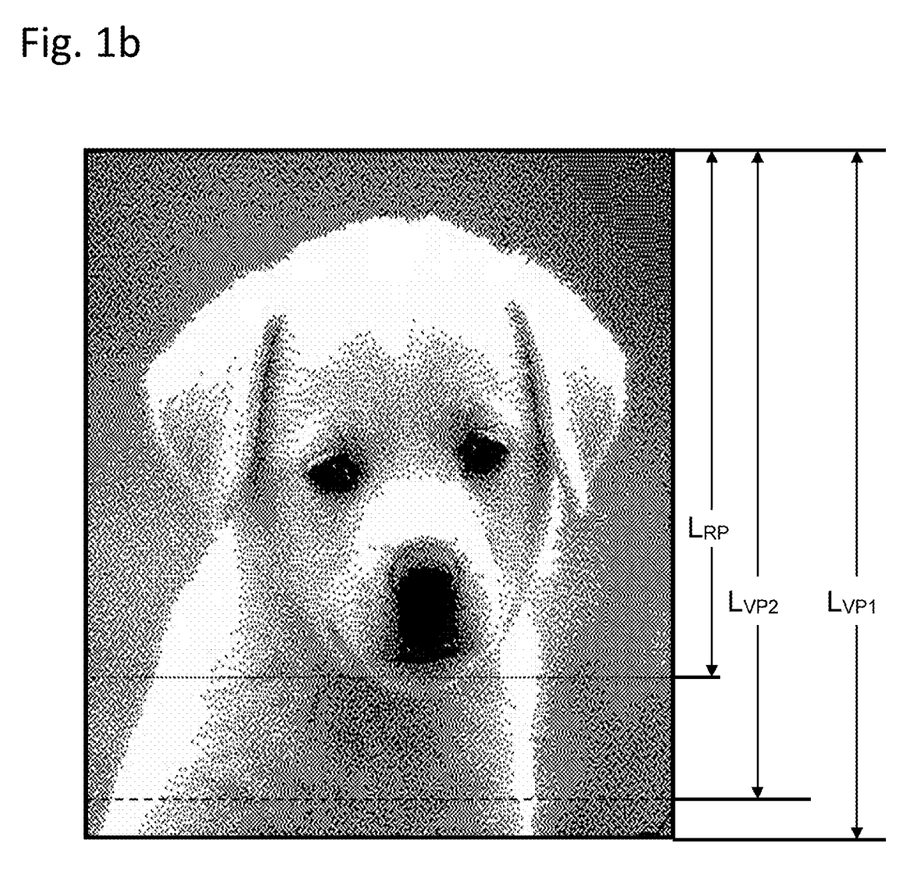
FIG. 1b a print image on the front side, with the corresponding dimensioning, according to an exemplary embodiment.

FIG. 1b shows a front side 18a of the recording medium of a print image before the drying. The page length $L_{VP1}$ of the print image after the printing by the first printing unit 110 and before the fixing and/or drying is longer than the length $L_{RP}$ required for the corresponding line count. The print image of the front side 18a was deliberately inserted into the length in order to take the static shrinkage effect into account in the fixing and/or drying. The page length of the front side is $L_{VP2}$ in the second printing unit 210, just before the printing of the back side. $L_{VP1} > L_{VP2}$ then typically applies.

Should the statically implemented elongation of the front side 18a in the first printing unit 110 now be ideal, the page length of the front side $L_{VP2}$ would be equal in length to the page length of the back side $L_{RP}$ that is required for printing. $L_{VP2} = L_{RP}$ thus applies (not depicted). In such an instance, an additional adaptation is no longer necessary, since then the front side 18a and the back side 18b are in register.

However, should the elongation of the print image on the front side in the first printing unit 110 turn out to be too much, such that the page length $L_{VP2}$ of the front side in the second printing unit 210, just before the printing of the back side 18b, is greater than the page length $L_{RP}$ necessary for the back side (it applies that: $L_{VP2} > L_{RP}$), as depicted in FIG. 1b, the method according to the disclosure then finds its application.

It is noted that the elongation of the print image on the front side 18a that is depicted in FIG. 1b is shown exaggerated in order to be able to better explain the method/device according to the disclosure.

Figure 2:
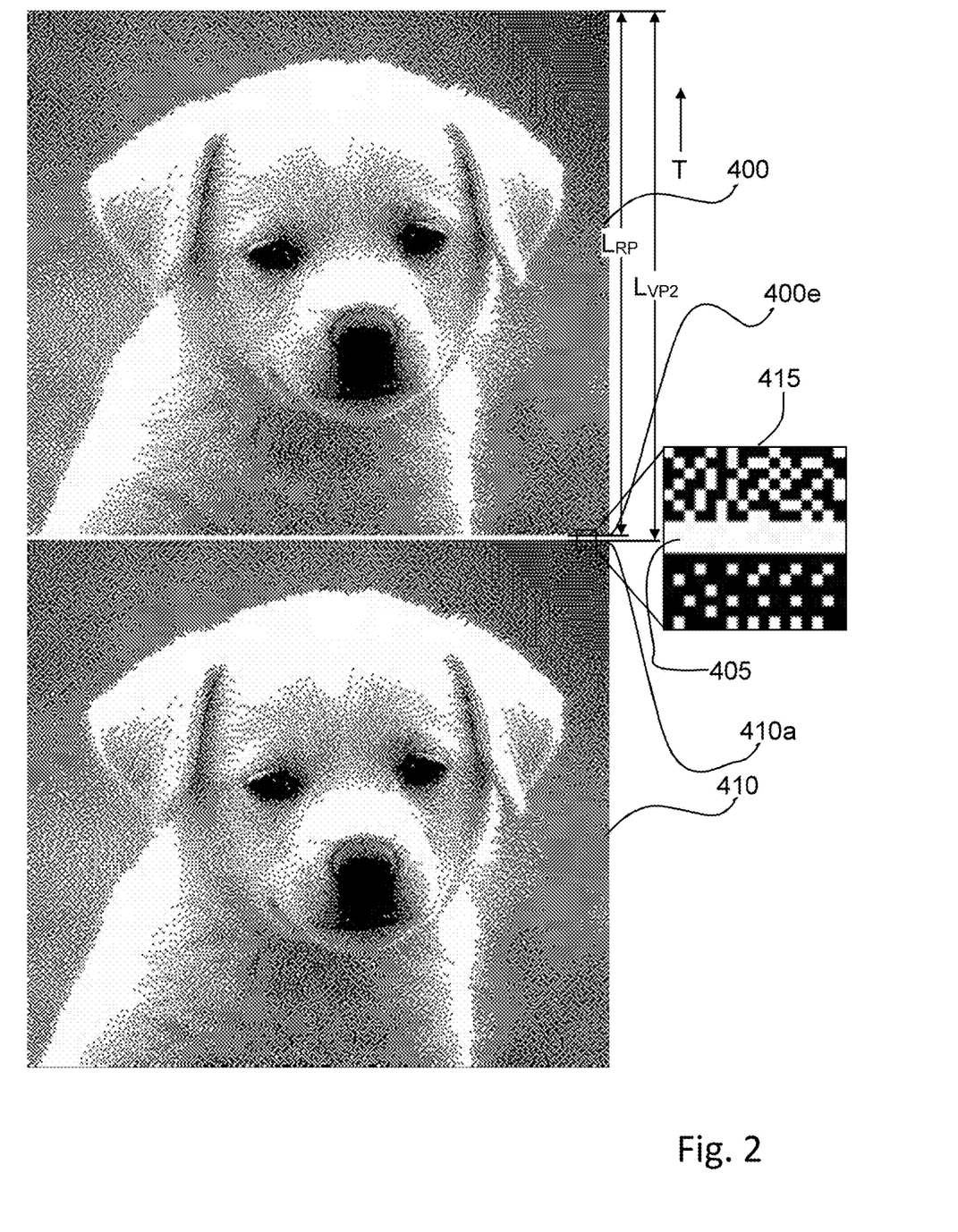
FIG. 2 two print images printed successively on the recording medium, with an enlarged detail of the transition between the print images, according to an exemplary embodiment.

FIG. 2 shows two print images 400, 410 successively printed on the back side 18b of a recording medium 18, with an enlarged detail 415 of the transition between the first print image 400 and the second print image 410. The length compensation of the first print image 400 on the back side 18b to the page length $L_{VP2}$ of the print page (not shown here) on the front side 18a took place via the insertion of blank lines or un-inked print lines, so that a visible white stripe has been generated in the intervening space 405 between the print images 400 and 410, which is not acceptable for print applications such as banner printing. By contrast, in transaction printing, such stripes are often imperceptible in the print image, and therefore acceptable. The print images 400, 410 were generated with the aid of the printing device 10 according to FIG. 1, wherein the third method specified in the specification preamble has been used for length compensation.

Figure 3:
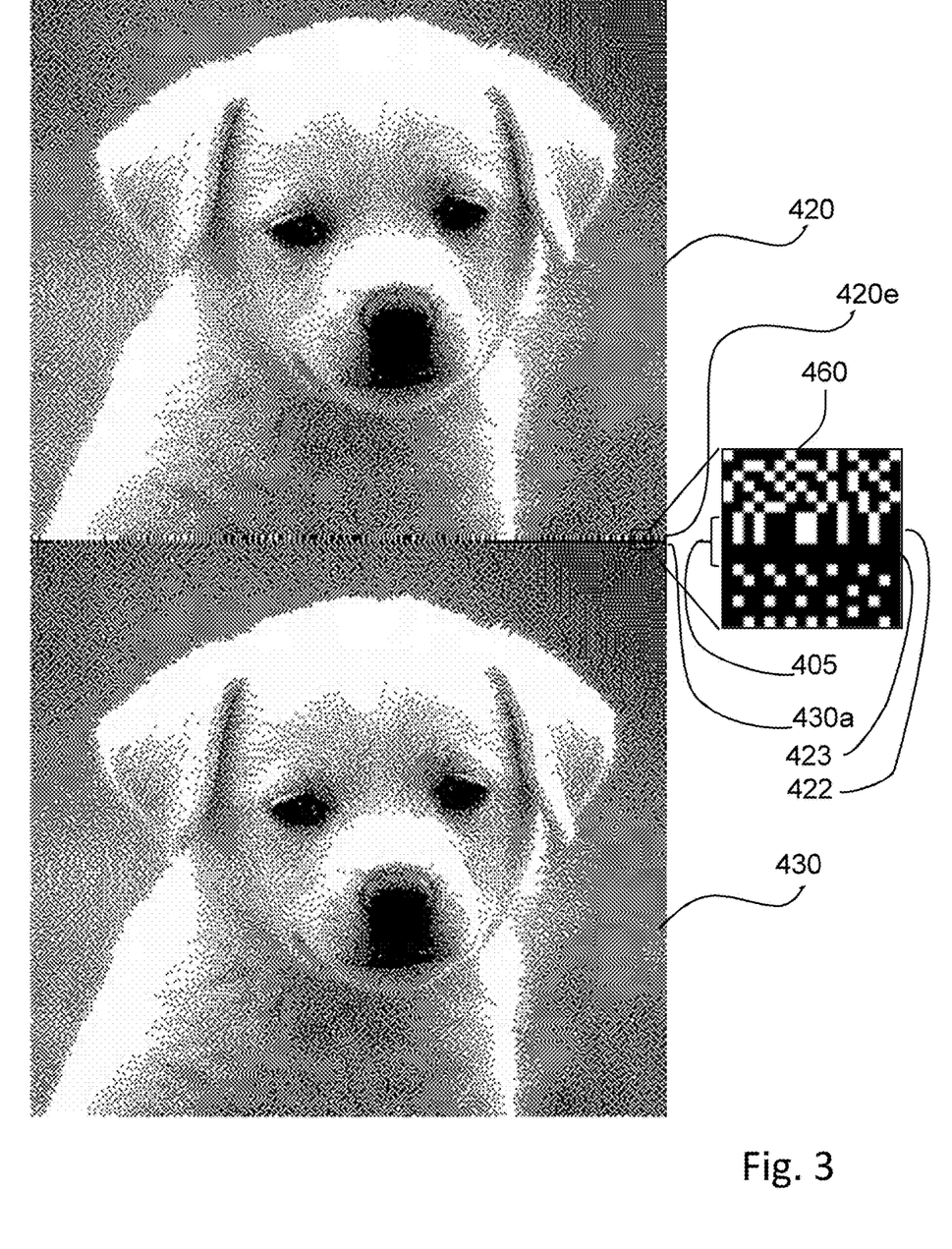
FIG. 3 the print images according to FIG. 2, with a length compensation according to an exemplary embodiment.

FIG. 3 shows first 420 and second 430 print images printed successively on the back side 18b of the recording medium 18, where the print images have been generated based on the same print data stream 16 like the first and second print images 400, 410 according to FIG. 1. In this example, a length compensation has been implemented by the printing device 10 according to a first exemplary embodiment. As is apparent in the enlarged detail 460 of the intervening space 405 from the first print image 420 to the second print image 430, the last line 422 of the first print image 420 is repeated twice at the end 420e of the logical first print image 410. Further, the first print line 423 of the second print image 430 is repeated once at the beginning 430a of the second print image 430, so that a continuous white strip is no longer visible in the transition between the two print images 420, 430, as in the transition between the print images 400, 410 according to FIG. 2.

Figure 4:
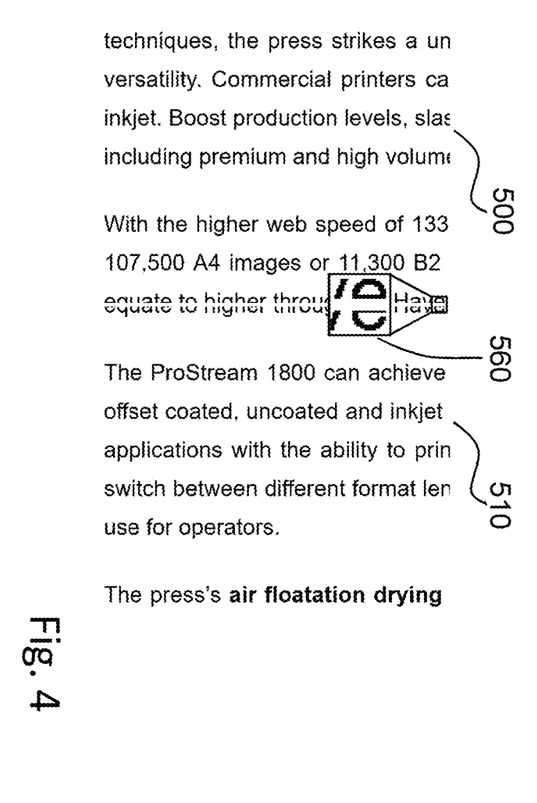
FIG. 4 the graphical depiction of a text, with an enlarged detail.

FIG. 4 shows the graphical depiction of text composed of two print images 500, 510, with an enlarged detail 560 at the transition between the first print image 500 and the second print image 510. For length compensation between the print images 500, 510, a plurality of blank lines has been inserted at the end of the first print image 500 so that an optically visible white stripe is present through the letters of a text line in the visual complete print image.

Figure 5:
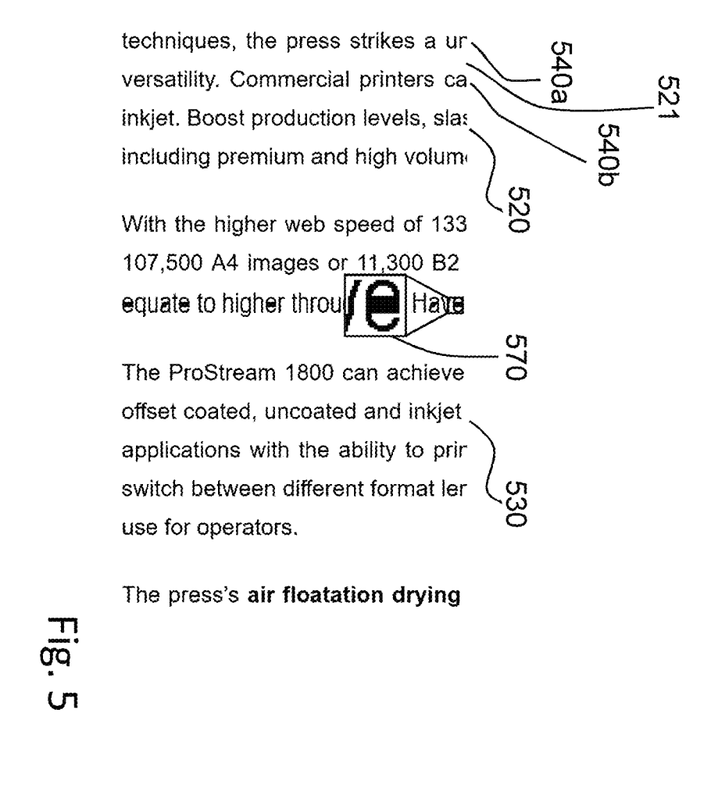
FIG. 5 a graphical depiction of the text according to FIG. 4, with a length compensation of the print image, according to an exemplary embodiment.

FIG. 5 shows a graphical depiction of the text according to FIG. 4, wherein the text has been generated with the aid of the print images 520, 530 based on the same print data stream 16 as the print images 500, 510 according to FIG. 4. For length compensation between the two print images 520, 530, a replication has been performed of the last line of the first print image and the first line of the second print image in the transition between the print images 520, 530. In FIG. 5, a length compensation thus takes place according to a first embodiment. What is disadvantageous about this first embodiment is that individual horizontal strokes, for example the middle horizontal stroke of the lowercase e or also regions of the lowercase a, are depicted visually wider and therefore are more noticeable, as is visible in the enlarged detail 570. The last print line of the first print image 520 and the first print line of the second print image 530 have hereby respectively been repeatedly printed multiple times. However, an interfering white stroke through the text as in FIG. 4 is avoided.

As an alternative to this, at least one blank line may be inserted into the intervening space 520 between the corresponding text lines 540a and 540b in order to avoid a distortion of the letters. Any arbitrary intervening space between the text lines is suitable for this.

Figure 6:
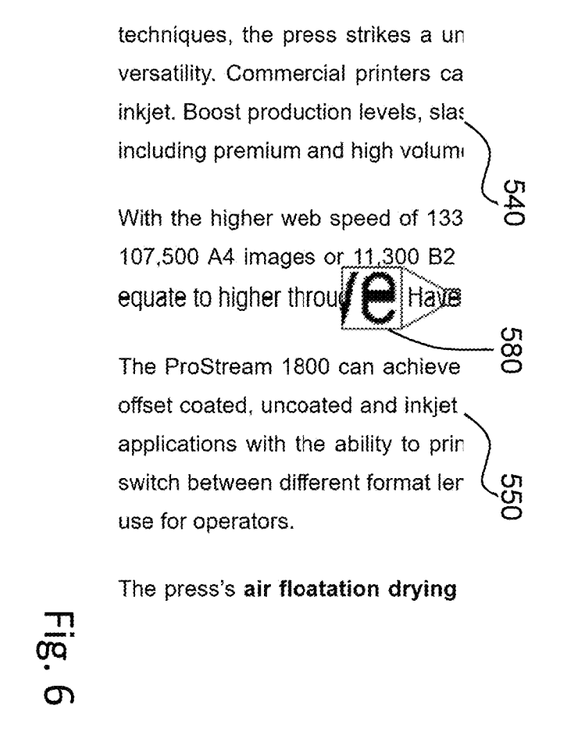
FIG. 6 a graphical depiction of the text according to FIGS. 4 and 5, with a length compensation according to exemplary embodiments.

FIG. 6 shows a graphical depiction of the text according to FIGS. 4 and 5, with a length compensation between the two shown print images 540, 550 according to a second embodiment. Given this second embodiment, both the last two lines of the first print image 540 and the first two lines of the second print image 550 have respectively been repeatedly printed once, wherein the interfering image effects according to the first embodiment according to FIG. 5 might be further reduced or avoided.

In the following table, the method for length compensation according to a variant of the first embodiment according to FIG. 5 is indicated as a simplified method in the second column, and the length compensation according to the second embodiment according to FIG. 6 is indicated in the third column. The first print image 520, 540 has a length of 1000 lines. For a complete printing of the first print page, a determined intervening space must be printed as follows with six additional print lines:

| Print page | Simple method Line number n | Refined method Line number n |
| --- | --- | --- |
| Page end | ... | ... |
| Page m | 996 | 996 |
|  | 997 | 997 |
|  | 998 | 998 |
|  | 999 | 998 |
|  | 1000 | 999 |
| Intervening space | 1000 | 999 |
|  | 1000 | 1000 |
|  | 1000 | 1000 |
|  | 1 | 1 |
|  | 1 | 1 |
|  | 1 | 2 |
| Page beginning | 1 | 2 |
| Page m + 1 | 2 | 3 |
|  | 3 | 3 |
|  | 4 | 4 |
|  | 5 | 5 |
|  | ... | ... |

In the following table, the repeated lines to be printed of the first print image 400, 420, 520, and of the second print image 430, 530, are indicated according to a variant of the first embodiment, wherein the number of additional lines to be printed on the first print page is indicated in the first column.

| Number of lines n to be inserted | Repetitions of the last line of print page m | Repetition of the first line of print page m + 1 |
| --- | --- | --- |
| 1 | 1 | 0 |
| 2 | 1 | 1 |
| 3 | 2 | 1 |
| 4 | 2 | 2 |
| 5 | 3 | 2 |
| ... | ... | ... |

The proposed achievements may advantageously be used in inkjet printing devices. However, they may also be used given electrographic printing devices whose recording methods for image generation are based in particular on the electrophotographic, magnetographic, or ionographic recording principle.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

For the purposes of this discussion, the term "processing circuitry" shall be understood to be circuit(s) or processor(s), or a combination thereof. A circuit includes an analog circuit, a digital circuit, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein. In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST 10 printing device
12 print data processor
14 raster image processor
16 16 print data stream
18 recording medium
18a front side of 18
18b back side of 18
100 first printing unit
110 first print group
112 first rotary signal encoder
114 first sensor
116 first apparatus controller
118 first drying unit
120-128 first print bars
130-138 first controllers for first print bars
200 second printing unit
210 second print group
212 second rotary signal encoder
214 second sensor
216 second apparatus controller
218 second drying unit
220-228 second print bars
230-238 second controllers for second print bars
400 first print image
400a beginning of the first print image
400b end of the first print image
405 intervening space between 400 and 410
410 second print image
410a beginning of the first print image
410e end of the second print image
415 detail enlargement of 405
420 first print image
420a beginning of the first print image
420b end of the first print image
422 last print line of 420
423 first print line of 430
425 intervening space between 420 and 430
430 second print image
430a beginning of the second print image
430e end of the second print image
460 detail enlargement of 425
500, 520 first page
521 intervening space between 540a and 540b
510, 530 second page
540a first text line
540b second text line
560, 570 enlargement (detail)
$L_{VP1}$ physical page length of a print image on the front side in the first printing unit
$L_{VP2}$ physical page length of a print image on the front side in the second printing unit
$L_{VL}$ logical page length of a print image on the front side
$L_{RP}$ physical page length of a print image on the back side
$L_{RL}$ logical page length of a print image on the back side
T feed direction

The invention claimed is:

1. A method for controlling an inkjet printing device having two printing units for printing to the front side and back side of a recording medium, the method comprising:
determining a physical page length of at least one print image applied onto the front side of the recording medium;
adapting a required page length of at least one print image to be applied onto the back side of the recording medium to the determined page length; and
repeatedly printing at least one print line of the print image for the back side in response to the required page length for application of the rear print page on the back side of the recording medium being smaller than the determined physical page length,
wherein at least one first print image and at least one second print image are to be applied on the back side of the recording medium, the second print image being arranged on the recording medium after the first print image, and the at least one print line to be repeated is inserted in proximity to a page end of the first print image and/or in proximity to a page beginning of the second print image, and
wherein a first number of last print lines of the first print image and a second number of first print lines of the second print image are printed repeatedly in an arising intervening space between the first print image and the second print image for the back side.

2. The method according to claim 1, wherein in response to a determined length difference from the determined physical page length and the required page length being a positive value,
determining a number of print lines required for printing the determined length difference, and
repeatedly printing at least one print line of the print image of the back side until the required number of print lines is reached.

3. The method according to claim 1, wherein the last print line of the first print image and/or the first print line of the second print image are printed repeatedly.

4. A method, for controlling an inkjet printing device having two printing units for printing to the front side and back side of a recording medium, the method comprising:
determining a physical page length of at least one print image applied onto the front side of the recording medium;

adapting a required page length of at least one print image to be applied onto the back side of the recording medium to the determined page length; and repeatedly printing at least one print line of the print image for the back side in response to the required page length for application of the rear print page on the back side of the recording medium being smaller than the determined physical page length, wherein at least one first print image and at least one second print image are to be applied on the back side of the recording medium, the second print image being arranged on the recording medium after the first print image, and the at least one print line to be repeated is inserted in proximity to a page end of the first print image and/or in proximity to a page beginning of the second print image, and wherein each of the last print lines is repeatedly printed one time, and each of the first print lines is repeated one time.

5. The method according to claim 1, wherein the first number and the second number are equal.

6. The method according to claim 1, wherein the physical page length is determined via a preset parameter.

7. The method according to claim 1, wherein the physical page length of the respective front print side is determined by measuring a clearance of two markings applied onto the front side of the recording medium, one of the two markings being arranged at the beginning of the front print side and another of the two markings being arranged at the end of the front print side.

8. The method according to claim 1, wherein given individual sheets, the page length of the respective print page is determined by measuring a clearance between a leading edge and a trailing edge of individual sheet in a conveyance direction of the print page upon printing the print image.

9. A non-transitory computer-readable storage medium with an executable program stored thereon, that when executed, instructs a processor to perform the method of claim 1.

10. An inkjet printing device, comprising:
a first printer configured to print at least one front print image onto a front side of a recording medium;
a second printer configured to print at least one rear print image onto a back side of the recording medium;
a sensor configured to detect a marking located on the recording medium, and/or to detect an edge of an individual sheet; and
a controller connected with the sensor and configured to:
determine a page length of a print image applied at least onto the front side of the recording medium; and
adapt a required page length of at least one print image to be applied onto the back side of the recording medium to the determined page length, wherein at least one print line of the print image for the back side is repeatedly printed in response to the required page length being smaller than the determined page length,
wherein at least one first print image and at least one second print image are to be applied on the back side of the recording medium, the second print image being arranged on the recording medium after the first print image, and the at least one print line to be repeated is inserted in proximity to a page end of the first print image and/or in proximity to a page beginning of the second print image, and
wherein a first number of last print lines of the first print image and a second number of first print lines of the second print image are printed repeatedly in an arising intervening space between the first print image and the second print image for the back side.

11. The inkjet printing device according to claim 10, wherein in response to a determined length difference from the determined physical page length and the required page length being a positive value, the controller is configured to:
determine a number of print lines required for printing the determined length difference, and
control the second printer to repeatedly print at least one print line of the print image of the back side until the required number of print lines is reached.

12. The inkjet printing device according to claim 10, wherein the last print line of the first print image and/or the first print line of the second print image are printed repeatedly.

13. An inkjet printing device, comprising:
a first printer configured to print at least one front print image onto a front side of a recording medium;
a second printer configured to print at least one rear print image onto a back side of the recording medium;
a sensor configured to detect a marking located on the recording medium, and/or to detect an edge of an individual sheet; and
a controller connected with the sensor and configured to:
determine a page length of a print image applied at least onto the front side of the recording medium; and
adapt a required page length of at least one print image to be applied onto the back side of the recording medium to the determined page length, wherein at least one print line of the print image for the back side is repeatedly printed in response to the required page length being smaller than the determined page length,
wherein at least one first print image and at least one second print image are to be applied on the back side of the recording medium, the second print image being arranged on the recording medium after the first print image, and the at least one print line to be repeated is inserted in proximity to a page end of the first print image and/or in proximity to a page beginning of the second print image, and
wherein each of the last print lines is repeatedly printed one time, and each of the first print lines is repeated one time.

14. The inkjet printing device according to claim 10, wherein the first number and the second number are equal.

15. The inkjet printing device according to claim 10, wherein the physical page length of the respective front print side is determined based on a measured clearance of two markings applied onto the front side of the recording medium, one of the two markings being arranged at the beginning of the front print side and another of the two markings being arranged at the end of the front print side.

16. The inkjet printing device according to claim 10, wherein given individual sheets, the page length of the respective print page is determined based on a measured clearance between a leading edge and a trailing edge of individual sheet in a conveyance direction of the print page upon printing the print image.

* * * * *